July 26, 1949.  F. PACHECO, JR  2,477,001
V DISK

Filed April 10, 1947  4 Sheets-Sheet 1

INVENTOR.
Frank Pacheco Jr
BY Victor J. Evans & Co.
ATTORNEYS

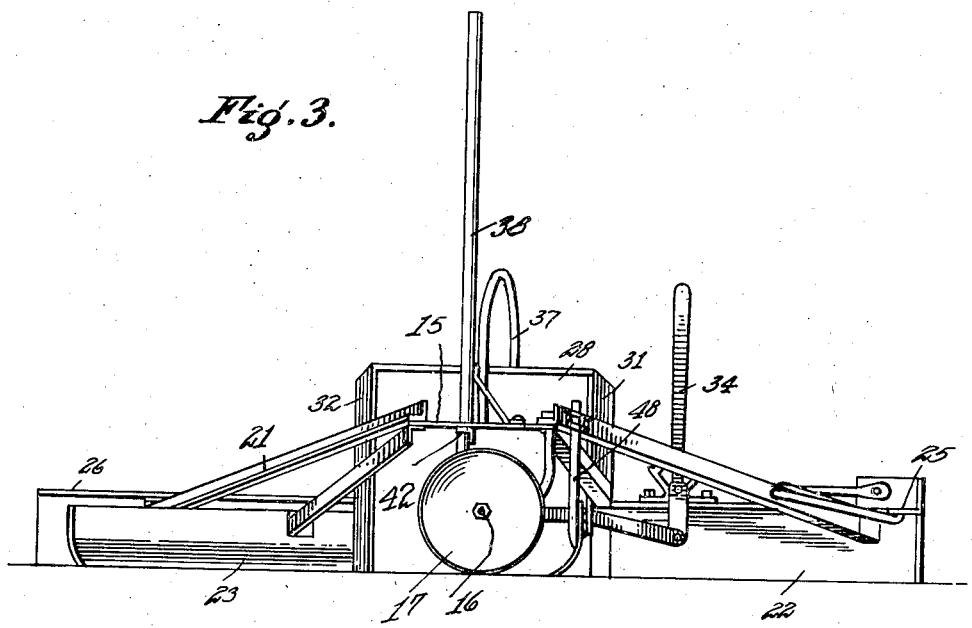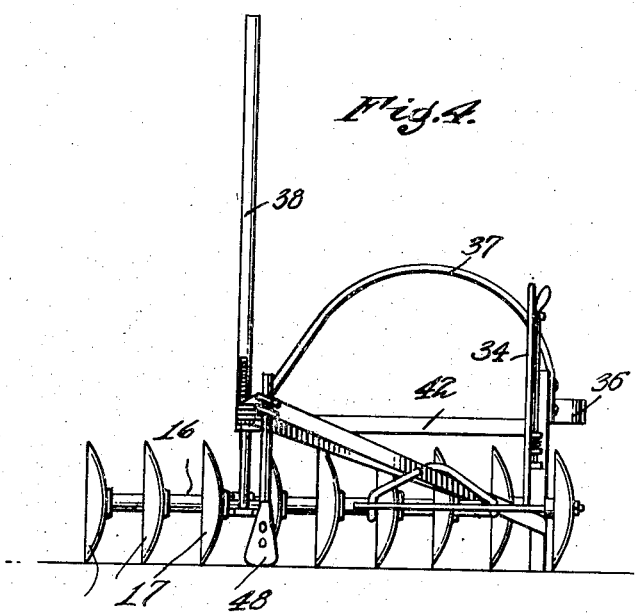

July 26, 1949.　　　F. PACHECO, JR　　　2,477,001
V DISK

Filed April 10, 1947　　　　　　　　　　4 Sheets-Sheet 3

INVENTOR.
Frank Pacheco Jr.
BY Victor J. Evans & Co.
ATTORNEYS

July 26, 1949.　　　　　F. PACHECO, JR　　　　2,477,001
V DISK

Filed April 10, 1947　　　　　　　　　　4 Sheets-Sheet 4

INVENTOR.
*Frank Pacheco Jr.*
BY *Victor J. Evans & Co.*
ATTORNEYS

Patented July 26, 1949

2,477,001

UNITED STATES PATENT OFFICE 2,477,001

V DISK

Frank Pacheco, Jr., Bakersfield, Calif.

Application April 10, 1947, Serial No. 740,580

5 Claims. (Cl. 37—80)

This invention relates to ditching machines and more particularly to machines for cleaning irrigating ditches.

It is an object of the present invention to provide a combined disking and side blade ditch machine for use in cutting out weeds and grass from the irrigating ditch and for raising the cut out weeds and grass to the top of the ditch and wherein the disking device within the machine can be angled to alter the cut of the same upon the weeds and grass and wherein there is adequate support for the machine in both a horizontal and a vertically angled position for which the machine can engage with the ground when in operation.

Another object of the present invention is to provide on a combined disking and scraping machine a guard to prevent the machine from being inverted and at the same time provide a handle by which the machine can be retained on its side when being turned at the end of the ditch.

For other objects and for a better understanding of the invention, reference may be had to the following detailed description taken in connection with the accompanying drawing, in which Fig. 1 is a side elevational view of my combined disking and scraping machine looking upon the land side thereof.

Fig. 3 is a side elevational view of the machine taken of the opposite side thereof from that shown in Fig. 1.

Fig. 4 is a front elevational view of my machine.

Figure 1:
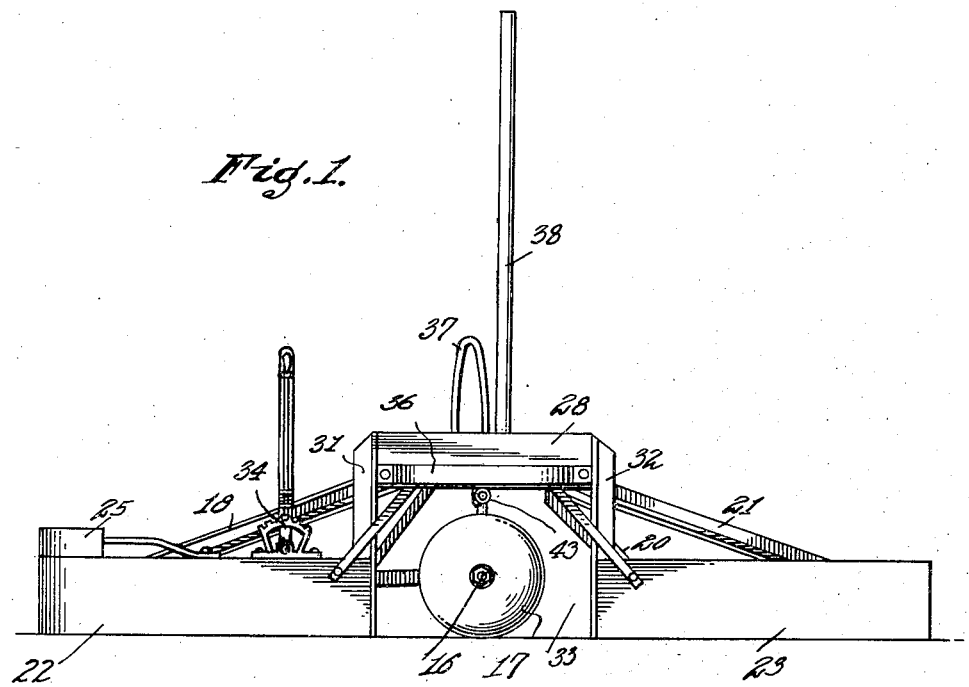
Figure 2:
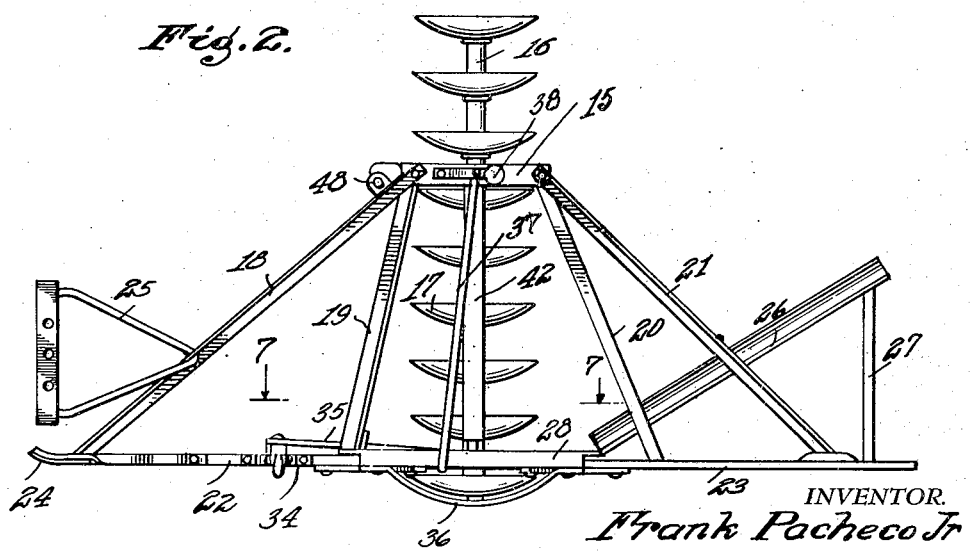
Fig. 2 is a top plan view of my machine.
Figure 5:
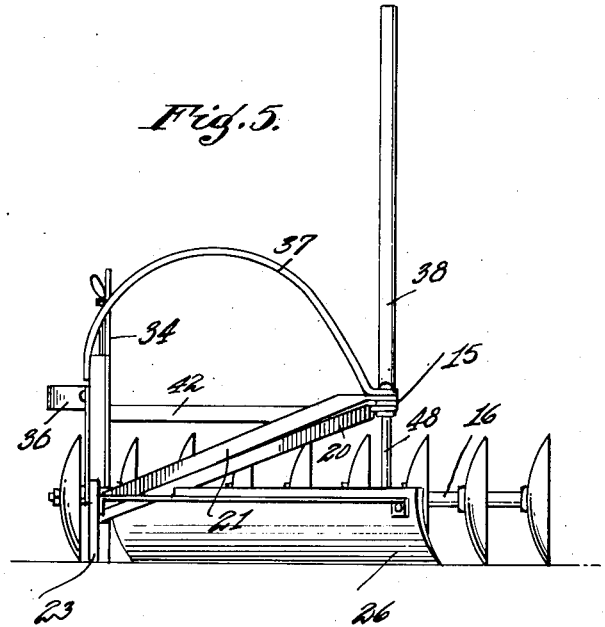
Fig. 5 is a rear elevational view of my machine.
Figure 6:
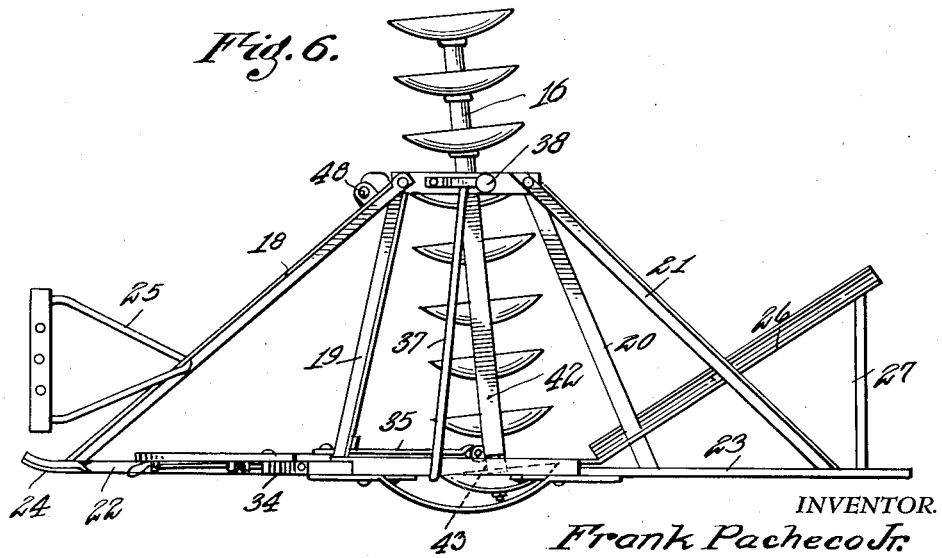
Fig. 6 is a top plan view of the machine showing the disking device set at an angled position.
Figure 7:
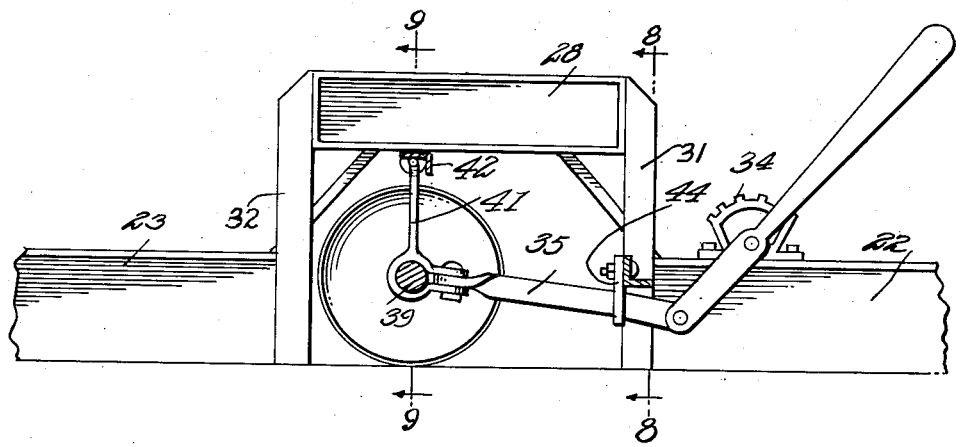
Fig. 7 is an enlarged longitudinal cross-sectional view taken substantially on line 7—7 of Fig. 2 and looking in the direction of the arrows thereof.
Figure 9:
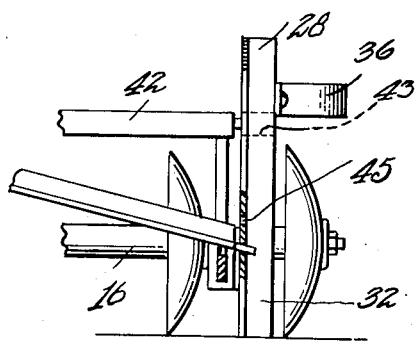
Figure 8:
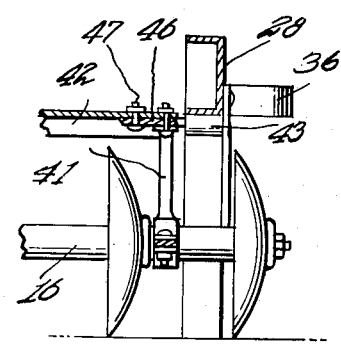

Figs. 8 and 9 are respectively cross-sectional views taken on lines 8—8 and 9—9 of Fig. 7.

Referring now to the figures, 15 represents a side frame piece to which a disking device 16 is pivotally connected for adjustment about a vertical axis to alter the angle of cut of the respective disks 17. Extending laterally from the side frame piece 15 are braces 18, 19, 20 and 21. To the outer ends of the inner braces 19 and 20, there is respectively connected guide blades 22 and 23. The outer end of the brace 18 is connected to the forward end of the guide blade 22. The guide blade 22 is rounded at its forward end as indicated at 24 so that it will not dig into the side of the ditch as the machine is pulled therealong. A hitch device 25 is connected to the brace 18 by means of which the machine is connected to a tractor or other draft appliance.

The brace 21 is connected to the rear end of the blade 23. Also connected to this blade 23 is an inclined scraper blade 26 which will gather the cut weeds and grass and convey them upwardly to the top and side of the ditch. The scraper blade 26 is braced in its inclined position at the rear end of the machine by a brace 27 extending between scraper blade 26 and the rear end of blade 23. The two blades 22 and 23 are connected together by an overhead beam 28 and vertical angle irons 31 and 32 whereby to provide a side opening 33 between the blades 23 and 22.

On the top of blade 22 there is mounted a quadrant lever arrangement 34 which is connected by a link 35 to the disking device 16 to effect an angular adjustment of the disking device about its pivotal connection with the side frame piece 15 whereby to alter the angle of cut of the disk 17.

On the beam 28, there is a drag shoe or skid 36 on which the side of the machine can be rested when the implement is to be turned at the end of the irrigating ditch. To support the machine in this position and to prevent the same from becoming inverted, there is provided an upwardly extending and curved brace or guard 37 connected between the beam 28 and the side piece 15. In order that the machine can be controlled on its side, there is provided an upwardly extending control post 38. By lifting upon this control post when the machine is on its side, the machine can be returned to its operative position.

Extending upwardly from axle 39 of the disking device are vertical parts 41 to which a transverse piece 42 is connected. On the end of the piece 42 there is provided a roller 43 adapted to engage with the under side of the beam 28 to roll thereover and to keep the disking device in the ground.

The link 35 extends through a U-shaped plate 44 which can be connected to any one of a set of holes 45 in the vertical angle iron 31. Also the roller 43 can be located at different positions by placing its supporting part 46 on either the top or bottom of piece 42, or a plate or shim can be disposed between the supporting part 46 and the piece 42 and retained by bolts 47 which connect the supporting part 46 with the piece 42.

At the opposite side of the machine there is connected to brace 18 a swivel shoe 48 which rests on the ground to control the depth of cut of the disk at that side of the machine.

It should now be apparent that there has been provided a combined disking and scraping machine for cleaning irrigating ditches in which the side blades at the front and rear of the machine are connected together by a raised beam construction under which the disking device can be disposed so that the outer disk can work in the bottom of the ditch and so that the disking device can be angled to alter the angle of cut of the disk. It should also be apparent that there has been provided adequate supporting means for retaining the machine when placed on its side whereby the machine will be prevented from becoming inverted.

Having now described my invention, I claim:

1. A combined disking and scraping machine for cleaning irrigating ditches comprising forward and rearward side blades, a beam structure for securing the side blades together in longitudinally spaced relationship to provide an opening therebetween, a side frame piece laterally spaced from the side blades and braces connecting the side frame piece with the side blades, a disking device connected to the side frame piece and extending through the opening between the front and rear side blades whereby the weeds can be cut at the bottom of the ditch, and an inclined scraping blade extending laterally from the rear side blade, a skid on the beam structure for providing a sliding surface on which the machine can be dragged when turned upon its side.

2. A combined disking and scraping machine for cleaning irrigating ditches comprising forward and rearward side blades, a beam structure for securing the side blades together in longitudinally spaced relationship to provide an opening therebetween, a side frame piece laterally spaced from the side blades and braces connecting the side frame piece with the side blades, a disking device connected to the side frame piece and extending through the opening between the front and rear side blades whereby the weeds can be cut at the bottom of the ditch, an inclined scraping blade extending laterally from the rear side blade, a skid on the beam structure for providing a sliding surface on which the machine can be dragged when turned upon its side, and an upwardly curved brace or guard connected between the beam structure and the side piece for preventing the inverting of the machine when being dragged on the side skid.

3. A combined disking and scraping machine for cleaning irrigating ditches comprising forward and rearward side blades, a beam structure for securing the side blades together in longitudinally spaced relationship to provide an opening therebetween, a side frame piece laterally spaced from the side blades and braces connecting the side frame piece with the side blades, a disking device connected to the side frame piece and extending through the opening between the front and rear side blades whereby the weeds can be cut at the bottom of the ditch, an inclined scraping blade extending laterally from the rear side blade, a skid on the beam structure for providing a sliding surface on which the machine can be dragged when turned upon its side, and an upwardly curved brace or guard connected between the beam structure and the side piece for preventing the inverting of the machine when being dragged on the side skid, and a control post connected to the side piece and to the guard by means of which the machine can upon applying lifting pressure be returned to its upright position.

4. A combined disking and scraping machine for cleaning irrigating ditches comprising forward and rearward side blades, a beam structure for securing the side blades together in longitudinally spaced relationship to provide for an opening therebetween, a side frame piece laterally spaced from the side blades and connected thereto by braces, a disking device pivotally connected to the side frame piece for angular adjustment about a vertical axis and extending through the opening between the front and rear side blades, and adjustable means connected between one of the side blades and the inner end of the disking device to adjust and retain the disking device to and in an angularly adjusted position, and said disking device having a roller adapted to engage with said beam structure to retain the disking device in the ground.

5. A combined disking and scraping machine for cleaning irrigating ditches comprising forward and rearward side blades, a beam structure for securing the side blades together in longitudinally spaced relationship to provide for an opening therebetween, a side frame piece laterally spaced from the side blades and connected thereto by braces, a disking device pivotally connected to the side frame piece for angular adjustment about a vertical axis and extending through the opening between the front and rear side blades, and adjustable means connected between one of the side blades and the inner end of the disking device to adjust and retain the disking device to and in an angularly adjusted position, said disking device having a roller adapted to engage with said beam structure to retain the disking device in the ground, and means for adjustably connecting the roller to different vertical positions upon the disking device whereby to alter the depth of cut of the same.

FRANK PACHECO, Jr.

REFERENCES CITED

The following references are of record in the file of this patent:

UNITED STATES PATENTS

| Number | Name | Date |
|---|---|---|
| 1,363,454 | Bullock | Dec. 28, 1920 |
| 1,516,805 | Wilson et al. | Nov. 25, 1924 |
| 1,765,031 | Peck | June 17, 1930 |